Aug. 8, 1961 H. C. LIEBMANN, JR 2,994,911
BRISKET OPENING SAW WITH STERILIZING ASSEMBLY
Original Filed July 13, 1954 2 Sheets-Sheet 1
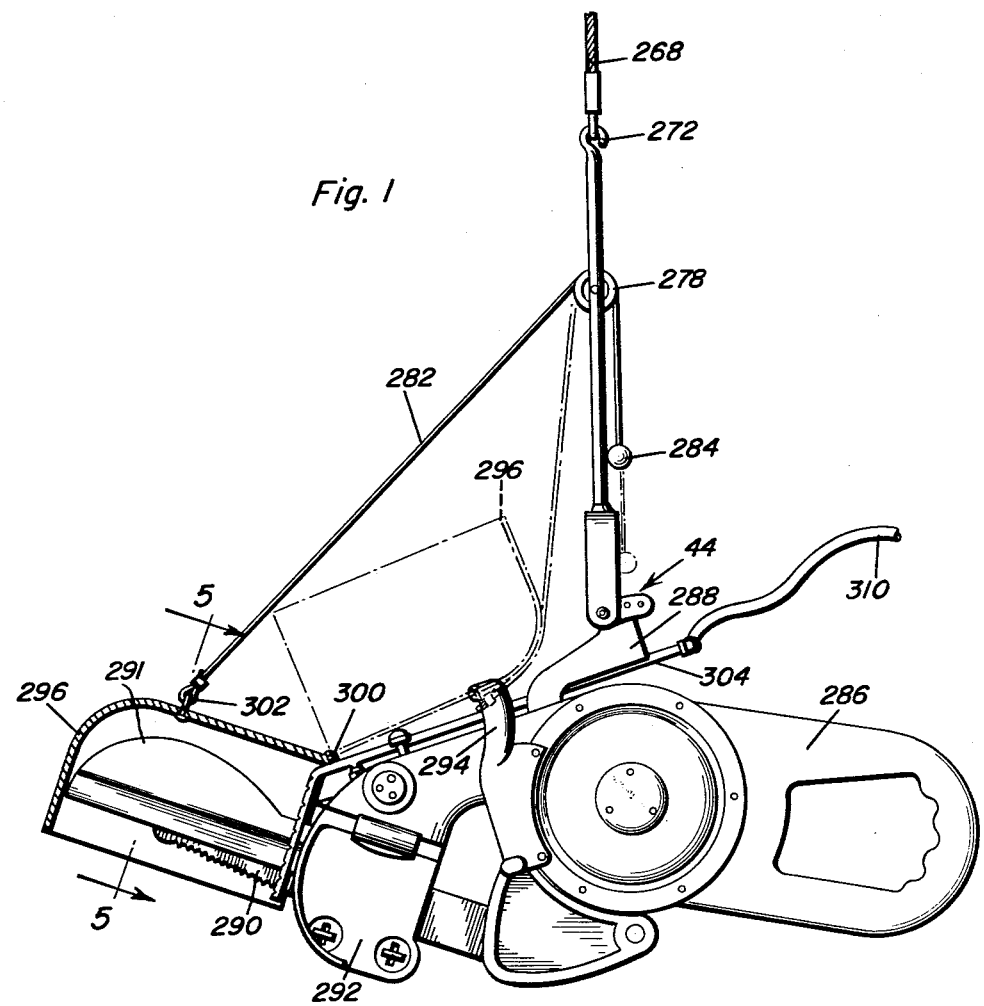
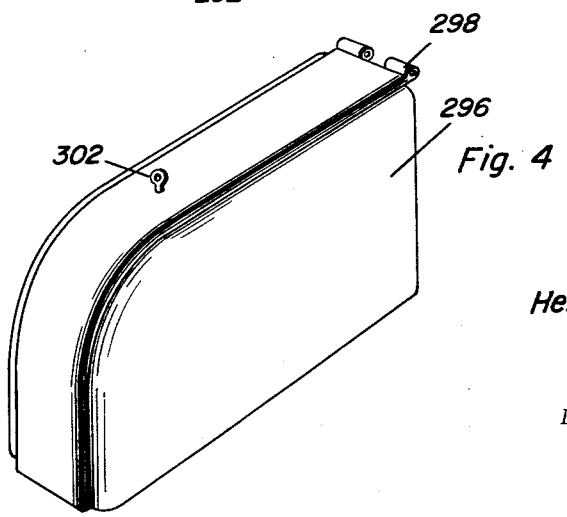
Herbert C. Liebmann, Jr.
INVENTOR.

Aug. 8, 1961 H. C. LIEBMANN, JR 2,994,911
BRISKET OPENING SAW WITH STERILIZING ASSEMBLY
Original Filed July 13, 1954 2 Sheets-Sheet 2
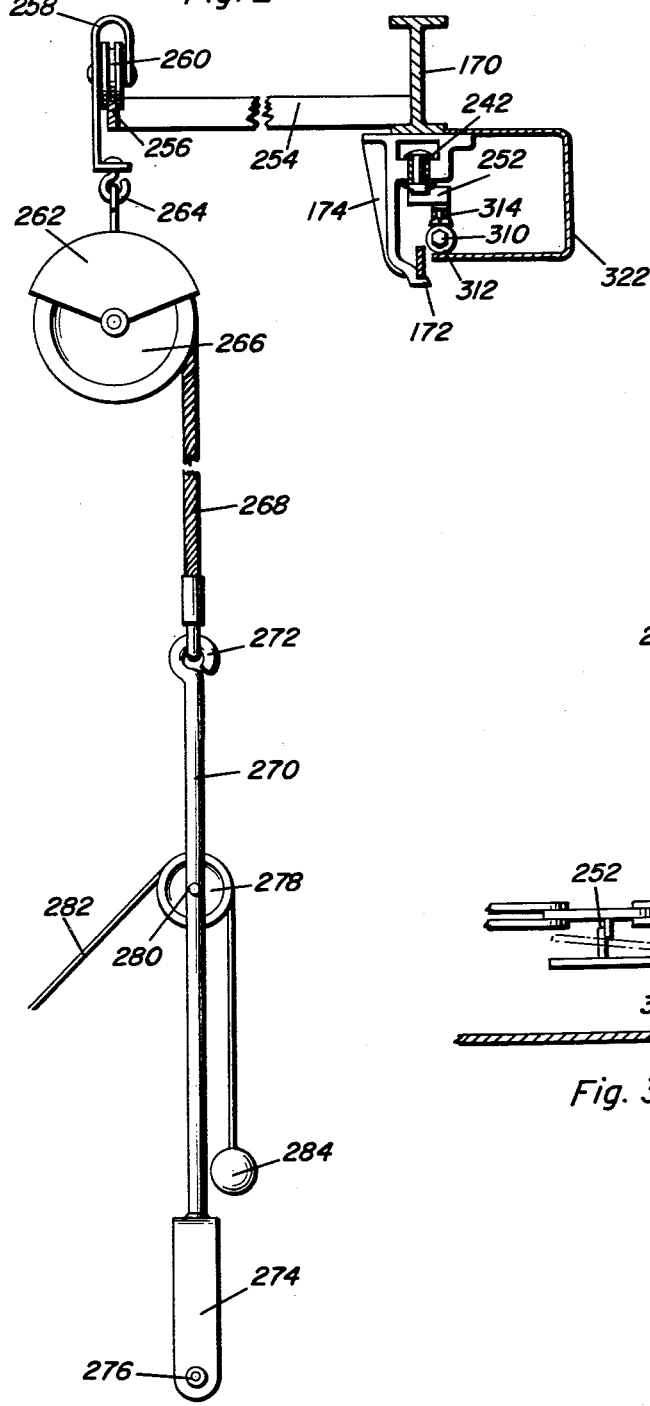
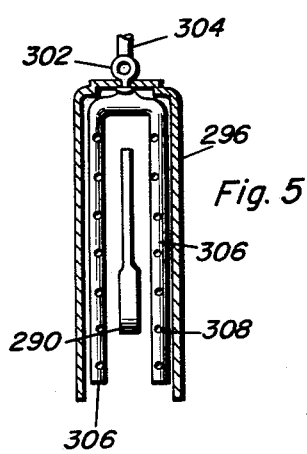
Herbert C. Liebmann, Jr.
INVENTOR.

United States Patent Office 2,994,911
Patented Aug. 8, 1961

2,994,911
BRISKET OPENING SAW WITH STERILIZING ASSEMBLY
Herbert C. Liebmann, Jr., Green Bay, Wis., assignor to Liebmann Packing Company, a corporation of Wisconsin
Original application July 13, 1954, Ser. No. 443,044, now Patent No. 2,883,700, dated Apr. 28, 1959. Divided and this application Mar. 3, 1959, Ser. No. 796,832
2 Claims. (Cl. 17—23)

The present invention generally relates to a brisket saw and more particularly for such a saw for opening the brisket of beef cattle and the application is a divisional application of copending application Serial No. 443,044, filed July 13, 1954, for Process and Apparatus for Slaughtering Animals, now Patent No. 2,883,700.

The primary object of the present invention is to provide a brisket saw in which the saw is supported from an overhead support and has a sterilizing assembly incorporated therewith in the form of a housing enclosing the saw with the supply of sterilizing fluid being controlled by movement of carcasses on an overhead conveyor whereby sterilizing fluid will only be sprayed onto the saw during periods of non-use thereby preventing any damage to the carcass by discharge of sterilizing fluid thereon.

Another object of the present invention is to provide a brisket saw which is simple in construction and operation, versatile, efficient in operation, easy to use, easily sterilized, semi-automatic in operation as to the sterilization and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view, with portions thereof in section showing the details of construction of the brisket saw or breast saw and the housing therefor, together with the sterilizing means for the saw;

FIGURE 2 is a detailed side elevational view showing the raising and lowering means for the brisket saw, together with the means for raising and lowering the housing;

FIGURE 3 is a top plan sectional view showing the lugs on the conveying chain for engaging a pivotal control element for operating the sterilizing means;

FIGURE 4 is a perspective view, on an enlarged scale showing the housing for the brisket saw; and FIGURE 5 is a detailed sectional view, on an enlarged scale, taken substantially upon a plane passing along section line 5—5 of FIGURE 1 showing the details of construction of the sterilizing means for the brisket saw and housing.

Referring now specifically to the drawings, it will be seen that the brisket saw is generally designated by the numeral 44 and includes a bracket 254 extending from an overhead rail 170 in lateral relation wherein the bracket 254 supports a short trackway 256 at its outer end for receiving a shackle 258 having a roller 260 thereon engaging the trackway 256. Pivotally and rotatably journaled in the lower end of the shackle 258 is a pulley housing 262 that is supported by complemental hook and eye members 264. The housing 262 supports a counterbalanced pulley 266 that is provided with a depending supporting cable 268. The supporting cable 268 is connected to a depending rod 270 by complemental hook and eye members 272 and the lower end of the rod 270 terminates in a U-shaped member 274 that is inverted and provided with apertures 276 at the lower end thereof. A rotatable pulley 278 is journaled on a pivot pin 280 on the rod 270 for receiving a flexible line 282 having an enlarged ball 284 on one end thereof for a purpose described hereinafter.

As shown specifically in FIGURE 1, an electric motor 286 is provided with a bracket 288 pivotally mounted between the legs of the U-shaped member 274 and the electric motor drives a brisket saw blade or cutting element 290 received in a shroud or guide 291 through a suitable gearing mechanism 292. Suitable handle means 294 is provided for manipulating the brisket saw 44 wherein the operator may easily operate the brisket saw 44. The counterbalanced pulley 266 will permit the brisket saw 44 to be raised and lowered and retained in any desired condition.

Referring now specifically to FIGURE 1, it will be seen that a generally right angular casing or housing 296 is provided with hinge barrels 298 on one end thereof for hingedly attaching the housing 296 to the frame of the brisket saw 44 by hinge means 300. It will be seen that the housing 296 covers the brisket saw blade 290 and shroud 291 for a purpose described hereinafter. An eye member 302 is provided in the upper outer end of the housing 296 for attachment to the end of the flexible line 282 wherein the housing 296 may be pivoted from a position covering the saw blade 290 and shroud 291 to a retracted position wherein the saw may be utilized in opening a brisket substantially as shown in phantom in FIGURE 1. Secured to the frame of the brisket saw 44 is a conduit 304 terminating in a pair of pipes 306 having a plurality of apertures 308 in longitudinally spaced and aligned position along the length thereof. It will be seen that the elongated pipes 306 form discharge nozzle means substantially in the form of a U-shaped member in communication with the conduit 304 that is connected to a pressurized steam line 310. When the pressurized steam is admitted to the conduit 304 and into the pipes 306, the steam and water, or hot water, will be discharged from the openings 308 onto and about the brisket saw blade 290 and shroud 291, wherein the brisket saw blade 290 and shroud 291 will be sterilized between each cutting operation.

Referring now specifically to FIGURE 2, it will be seen that the conduit 310 is connected to control valve means including a valve 312 having a plunger valve stem 314 thereon wherein the plunger valve stem 314 is spring urged to an open position and an actuating arm or control element 316 is pivoted to a bracket 318 by pivot pin 320. The bracket 318 is secured to a supporting structure 322 and arm 316 engages stem 314. The lug 252 on an overhead conveyor chain 242 engages the actuating arm 316 and, due to the cam shape of the actuating arm 316, the arm 316 will be urged towards and into engagement with the valve plunger stem 314 for depressing the same thereby closing the valve 312 and terminating the flow of steam or hot water in the conduits 310 and 304. It will be seen that each time a carcass (not shown) is positioned in front of the brisket saw, generally indicated by the numeral 44, the lug 252 on the conveying chain 242 will engage the actuating arm 316, thereby closing the valve 312 and stopping the flow of sterilizing fluid in the conduits 310 and 304 and in the pipes 306. Due to the elongated nature of the actuating arm 316, the valve 312 will remain closed during the brisket opening operation and during movement of the conveying chain 242, thereby assuring that the sterilizing fluid supply will be closed during the actual brisket-opening operation. As soon as the chain 242 carries the carcass away from the saw 44 and the lug 252 out of engagement with the actuating arm 316, the valve 312 is opened, thereby admitting sterilizing fluid to the conduits 310 and 304 and pipes 306, and thereby sterilizing the saw blade 290 and shroud 291 that is encased in the housing 296. It will be seen that the housing 296 confines the sterilizing fluid and prevents burn injuries to the operator of the brisket saw. It will be seen that upon each brisket-opening operation, the housing 296 is pivoted to an inoperative position as shown in FIGURE 1 and the flow of sterilizing fluid is automatically cut off by the lug 252 on the chain 242. It will be seen that the chain 242 continues to carry the carcass past the brisket saw station wherein the sterilizing procedure of the brisket saw will begin automatically as soon as the carcass has left the brisket saw station. This prevents any possible contacts between the heated sterilizing fluid and the animal that is being dressed while the sterilizing fluid retains the brisket saw in a sterile and sanitary condition. The particular sterilizing fluid may be either steam, hot water, or a combination of both as desired, and it will be seen that the housing 296 not only provides a guide for the sterilizing fluid but also prevents escape of the fluid therefrom except in a downward direction and consequently prevents burn injuries due to the operator of the brisket saw station by his coming into contact with the sterilizing fluid.

The brisket saw 44 is provided with the usual brisket saw blade or element 290 driven by a suitable electric motor 286 having handles 294 thereon for manipulation of the same. The counterbalance support pulley 266 is provide for raising and lowering and retaining the brisket saw 44 in adjusted position. The casing or housing 296 is provided over the reciprocating saw element 290 and shroud 291 and the flexible line 282 is connected thereto and provided with a handle 284 wherein the casing or housing 296 may be pivoted to an out-of-the-way position substantially as illustrated in phantom in FIGURE 1.

Sterilizing pipes 306 are positioned at the rear portion of the housing 296 and sterilizing fluid is discharged through the openings 308 onto the reciprocating saw element 290 and shroud 291, thereby sterilizing these elements. The housing 296 prevents spraying of the hot sterilizing fluid onto the carcass and onto adjacent workmen, thereby preventing damage to the carcass being dressed and also preventing burns that may be caused by the sterilizing fluid which is heated to a high degree. As shown specifically in FIGURE 3, the lug 252 on the continuous chain 242 engages the actuating arm 316 that rides against the plunger valve stem 314 of a valve 312, thereby shutting off the sterilizing fluid during actual movement of the carcass past substantially the entire brisket sawing operation, thereby preventing flow of the sterilizing fluid during the actual time that the brisket saw is being utilized and thus insuring that the hot sterilizing fluid will not come into contact with the carcass being dressed. Immediately upon passing of the carcass beyond the brisket saw, the projection or lug 252 is disengaged from the actuating arm 316 and, due to the spring-loaded condition of the plunger valve stem 314, the valve 312 will be opened, thereby permitting the sterilizing fluid to be discharged through the opening 308 onto the reciprocating saw element 290 and the shroud 291. The housing 296 may be pivoted downwardly into enclosing relation to the reciprocating saw element 290 and shroud 291, thereby preventing spraying of the sterilizing fluid to adjacent areas onto the cattle being dressed or onto nearby workmen.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A sterilizing assembly for a butchering tool having a cutting element and disposed adjacent an overhead conveyor chain and an overhead rail for supporting a plurality of carcass supporting shackles thereon, the shackles being engaged by and moved along the rail by said chain, said chain having a plurality of longitudinally spaced lugs thereon, said sterilizing assembly comprising discharge nozzle means adapted to be disposed adjacent the cutting element of the tool, a supply conduit communicated with said nozzle means, a control valve means disposed in said conduit for control of the discharge of sterilizing fluid from the nozzle means, said valve means including a movable control element adapted to be disposed in the path of movement of the lugs on the chain for actuation thereby, said control valve means being closed when the control element is engaged by one of said lugs for preventing flow of sterilizing fluid to the tool when a lug is engaging the control element.

2. The combination defined in claim 1 wherein said butchering tool is a brisket saw including an elongated blade, said sterilizing assembly including a housing enclosing the blade and the nozzle means for confining sterilizing fluid discharged from the nozzle means, and means pivotally mounting the housing on the brisket saw for movement to a retracted position thereby revealing the brisket saw blade.

References Cited in the file of this patent

UNITED STATES PATENTS

| | | |
|---|---|---|
| 1,434,440 | Knudsen | Nov. 7, 1922 |
| 2,596,481 | Hincks | May 13, 1952 |